July 14, 1925.

G. DE SANTIS 1,545,583

COMPOSITE PNEUMATIC VEHICLE TIRE

Filed May 21, 1923

INVENTOR.
Gino De Santis
BY Joseph J. O'Brien
ATTORNEY.

Patented July 14, 1925.

1,545,583

UNITED STATES PATENT OFFICE.

GINO DE SANTIS, OF MONSON, MASSACHUSETTS.

COMPOSITE PNEUMATIC VEHICLE TIRE.

Application filed May 21, 1923. Serial No. 640,574.

*To all whom it may concern:*

Be it known that GINO DE SANTIS, subject of the King of Italy, residing at Monson, in the county of Hampden and State of Massachusetts, has invented certain new and useful Improvements in Composite Pneumatic Vehicle Tires, of which the following is a specification.

This invention relates to improvements in vehicle tires and its leading object is to provide a pneumatic rubber tire with a floating metal tread.

The invention is the result of years of practical experimental effort and is embodied in a construction which includes a standard pneumatic rubber tire and a metal tread interlocked against displacement in such manner that the metal tread can move relatively to the tire.

With the above and other objects in view the invention consists in certain new and useful constructions, combinations, and arrangements of parts, clearly described in the following specification and fully illustrated in the accompanying drawings, in which:—

Figure 1:
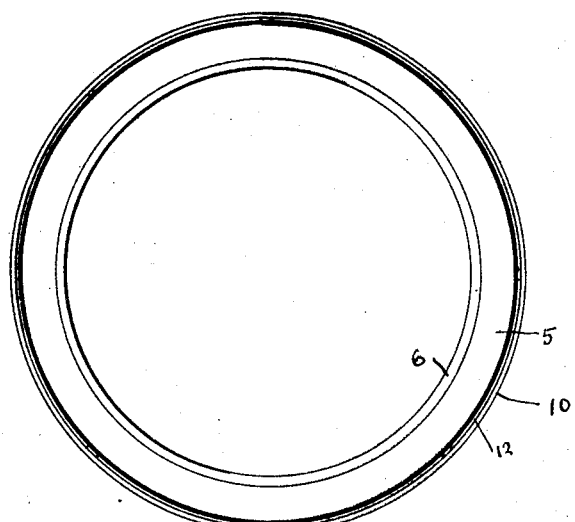
Fig. 1 is a side elevation of a tire embodying my invention.
Figure 3:
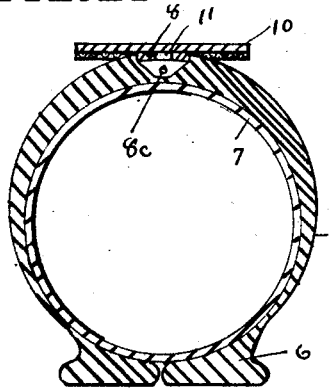
Fig. 3 is a transverse sectional view.
Figure 2:
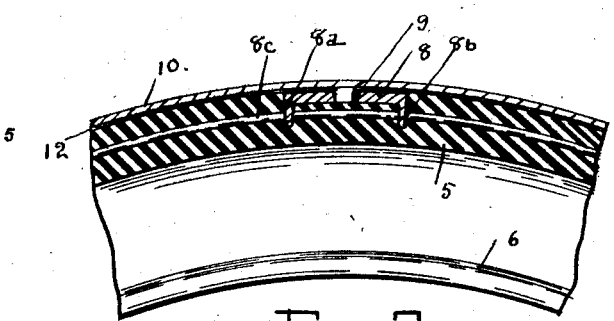
Fig. 2 is a detail sectional view through the tire, taken to show the relation of the metal tread to the rubber tire on an enlarged scale.
Figure 4:
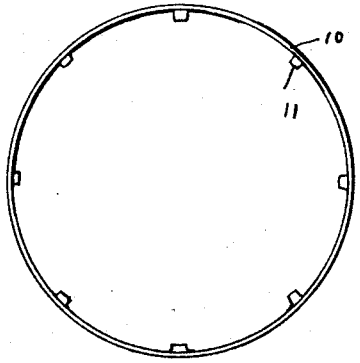
Fig. 4 is a side elevation of the metal tread.

Referring to the accompanying drawings illustrating the invention, 5 designates a rubber tire, known throughout the trade as a "shoe" or "case", and which is composed of fabric or cord impregnated with rubber to provide a hollow annular body, having the usual bifurcated base 6. In this tire or shoe the usual pneumatic tube 7 is disposed, whereby the tire may be inflated and deflated in the usual manner.

The tread of the tire 5 is formed with relatively less tread rubber than the usual standard tire used on pleasure and light passenger vehicles, and is equipped with a series of metal inserts or socket plates 8, which are circumferentially spaced from each other and preferably embedded in the rubber with the outer faces of the plates flush with the outer face of the tire. The plates are anchored to the fabric and rubber of which the tire is composed by means of lugs $8^a$ which are formed with eyes $8^b$ through which the cable $8^c$ extends. The cable is embedded in the fabric and rubber and effectively retains the inserts in place. Each plate is formed with a central socket 9, the walls of which may be circular, straight or tapered.

The metal tread 10 consists of a flat metal or steel or iron band which is adapted to fit on the tread of the tire 5 in snug engagement therewith. This metal tread is provided with a series of radially spaced lugs or projections 11 which are adapted to fit in the sockets formed in the plates 8.

The outer surface of the metal tread may be smooth or roughened, or provided with a series of indentations, to increase its tractive engagement with the road. The entire metal tread has a floating action on the tire. In order to eliminate all noise the inner face of the metal tread is equipped with a fabric lining 12.

When the wheel on which the tire is mounted rides over a rock or road projection the metal tread will distribute the upward thrust over a greater portion of the tire than would occur when the usual tire engages such a rock or projection.

After repeated trial I have found that my improved tire rides smoother than the ordinary tire; that it absorbs shocks better; that it protects the tire against punctures; that it will permit of a cheaper rubber tire, without sacrifice of its strength or riding qualities.

The metal tread is placed in position by first deflating the tire, aligning the projections with the sockets, and then inflating the tire.

Having described my invention I claim:—

In combination, a resilient rubber tire having a tread in which a metallic cable is embedded, said cable extending circumferentially in the tire and located medially of the sides of the tire, a series of members having ears through which the cable extends, and a metallic tire having flat inner and outer surfaces and connected to the members, whereby the longitudinal side portions of said metallic tire will be separated from the adjacent convex face of the tread.

Signed by me at Monson.

GINO DE SANTIS.